Feb. 15, 1927.
A. CAMPBELL
1,617,573
DUMP CAR
Filed Jan. 31, 1925　　2 Sheets-Sheet 1
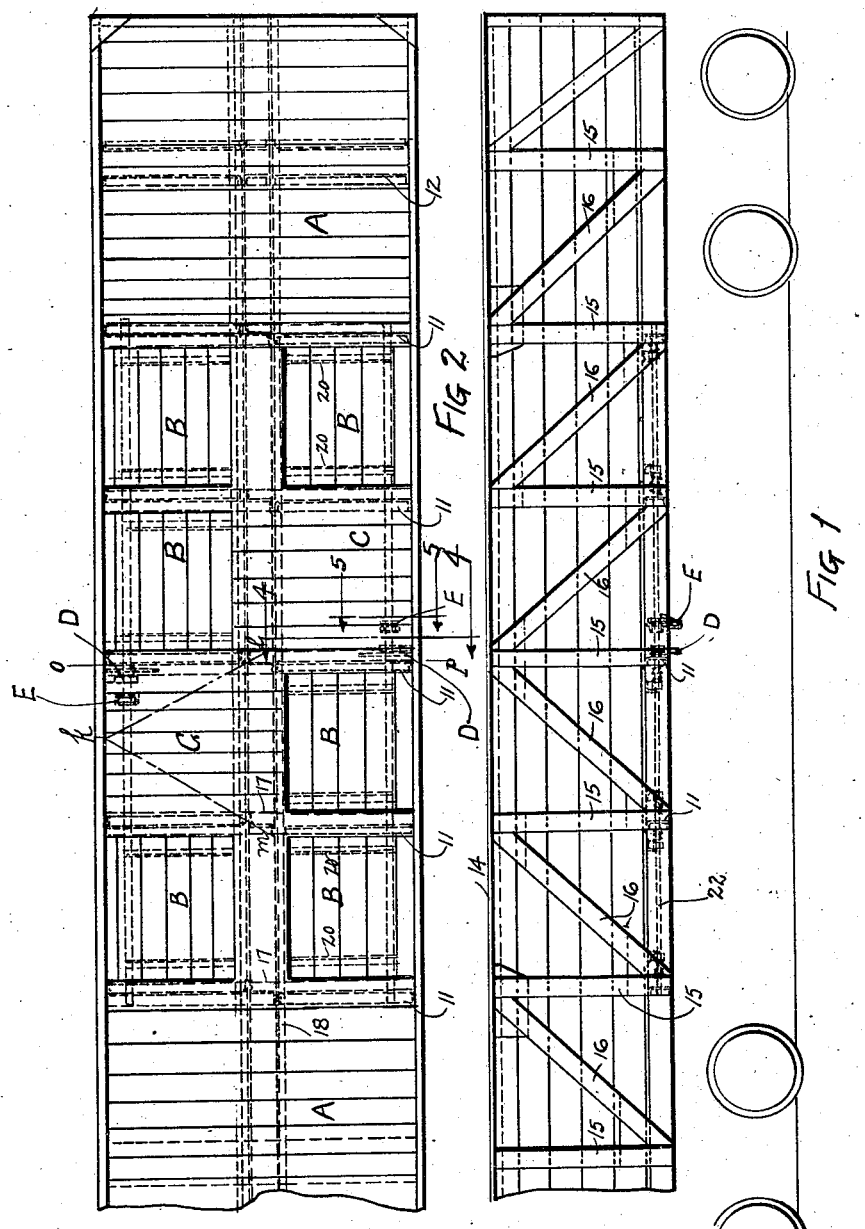
INVENTOR.
ARGYLE CAMPBELL
BY George D. Haight
HIS ATTORNEY Feb. 15, 1927.
A. CAMPBELL
DUMP CAR
Filed Jan. 31, 1925
1,617,573
2 Sheets-Sheet 2
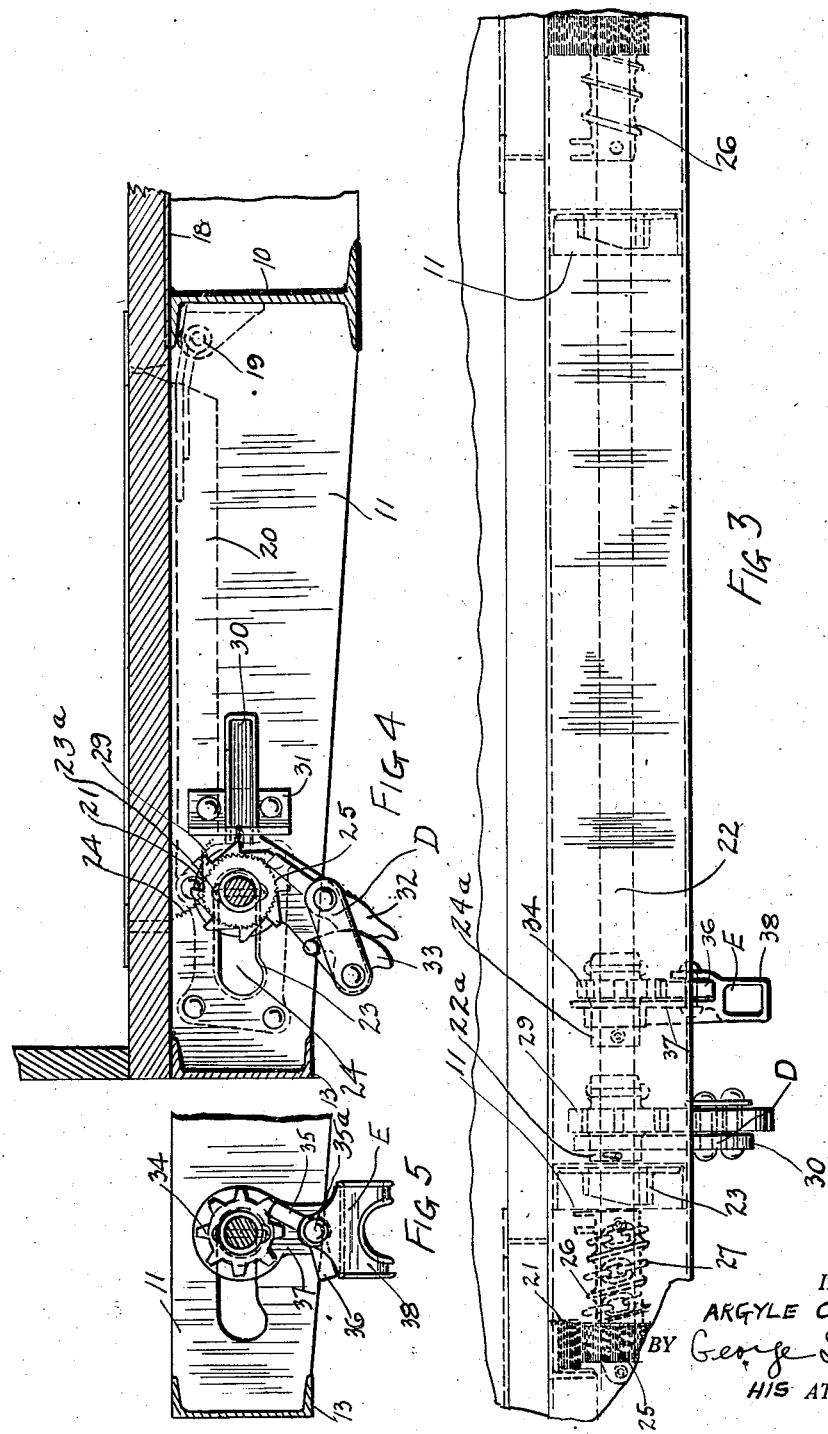
INVENTOR.
ARGYLE CAMPBELL
BY George I Haight
HIS ATTORNEY Patented Feb. 15, 1927.

1,617,573

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

DUMP CAR.

Application filed January 31, 1925. Serial No. 5,918.

My invention relates to improvements in dump cars.

In the gondola type of dump car adapted to discharge a considerable percentage of lading through floor doors, it is usual to operate said doors by means of a winding shaft actuated by mechanism fixed to one end portion thereof, and in the case of cars having dump doors only between the trucks, such actuating mechanism is usually disposed immediately adjacent the trucks. This method of operation generally requires shafts having a considerable cross-sectional area to resist the excessive torsion developed therein due to the length of shaft subject to twisting and bending, and in addition operation of such shaft actuating mechanism is attended with some danger to the operator due to its close proximity to the car trucks and the swinging doors.

It is an object of my invention to provide a construction in which torsional strains upon the winding shafts are largely obviated, such construction including an arrangement of dump doors, and mechanism for actuating the winding shafts, whereby the weight of the car is reduced, the mounting for the actuating mechanism is rendered more effective, and the safety and convenience of the operator are greatly enhanced.

Another object of the invention is to improve the construction of the car by standardizing the parts so that the operating mechanism on one side of the car will be exact duplicates of those on the other side of the car, thereby obviating the necessity of providing right and left parts for the respective mechanisms.

Further my invention resides in certain other details of construction such as will be more fully pointed out hereinafter and claimed.

In the drawings forming a part of this specification, Fig. 1 is a side view of the major portion of a car, showing my improved construction incorporated therein. Fig. 2 is a top plan view of the car shown in Fig. 1. Fig. 3 is an enlarged view of a portion of Fig. 1, showing the operating mechanism in greater detail and the relation of the same to other parts of the car structure. Fig. 4 is a sectional view taken through one-half of the car, on a line corresponding substantially to line 4—4 of Fig. 2. Fig. 5 is a sectional view through a portion of the car corresponding substantially to the line 5—5 of Fig. 2, and showing the shaft actuating means.

In said drawings the car is shown as provided with a center sill 10, cross-members 11, body bolsters 12, side sills 13, side walls 14, side stakes 15, diagonal braces 16, transversely extending cover plate 17 over the cross-members, and a longitudinally extending plate 18 between the center sills.

Referring more particularly to Figs. 1, 2 and 4 it will be noted that the bottom of the car is flat throughout and is composed of fixed floor sections A extending over the trucks. Intermediate the trucks, the floor of the car is provided with a series of drop doors B. Said doors B are disposed on opposite sides of the center-sill and by referring to Fig. 2, it will be noted that in each series of doors, there is provided a fixed floor section C on each side of the car, interposed between two of the doors of each series and extending between two of the adjacent cross-members. It will be noted that the fixed floor section C on one side of the center sill is transversely opposite a floor door B on the other side of the center sill, so that in so far as the central bottom portion of the car is concerned, it may be said to be composed of alternated and staggered fixed floor sections and pivoted doors.

As shown in Figs. 2 and 4, the floor doors B are pivotally mounted along their inner edges as indicated at 19, to suitable hinge-butts, preferably attached to the center sill. Each of the doors preferably is composed of a plurality of longitudinally extending boards or planks, secured together on their undersides by a plurality of braces 20. Each of said braces at the outer edge of the associated door, is provided with a bracket 21, beneath which the door raising and supporting shafts are adapted to move for the purpose of supporting the door, as will hereinafter be more fully explained, and in this connection, since the operating shaft and associated mechanisms, are similar except as hereinafter referred to, only one of the same will be described in detail. The shaft on one side of the car is indicated at 22 and is preferably of sufficient length to operate a plurality of doors in unison, and in the present invention all the doors on one side of the car are operated in unison by the shaft 22, and for this purpose the shaft extends longitudinally of the car beneath all three doors of the series beneath the fixed floor sections, and in this manner being supported by five cross-beams.

The door shaft 22 is supported in bearings 23 disposed adjacent the free edges of the doors. The bearings 23 are each provided with an elongated slot 24, within which the shaft is adapted to have lateral movement in the manner and for the purpose hereinafter described. Each of the brackets 21 on the under sides of the doors includes a rounded, serrated portion 24, adapted to cooperate with correspondingly serrated wheels 25 rigidly secured to the shaft 22. Adjacent each serrated wheel 25 is a chain winding drum 26 having a helical groove around which winds a lifting chain indicated conventionally in Fig. 3 at 27, one end of said chain being secured to the door and the other end to the drum as will be understood. In this general type of mechanism, as the shaft 22 is turned in a closing direction, the chains 27 wind around the drums 26, thus lifting the doors until the latter are almost in closed position, at which time further winding of the chains on the drums pulls the shaft 22 inwardly along the bearing slots 24 of the brackets 21, and thereafter the shafts are rolled under the doors, thus forcing the latter to fully closed position and also holding them closed with the load transferred to the shaft.

Hitherto it has been usual in cars of this type to dispose the means for actuating door operating shafts at the ends of the shaft, but it is found that there is considerable torsion developed in the shaft due to the length of the same, and it becomes necessary to provide heavy shafts and to restrict the length thereof within reasonable limits as well as to restrict the number of door units operable by each shaft. This condition above described is further accentuated when the shaft is bodily movable, as there is not only the twisting tendency but there is also a strong tendency for the shaft to bend due to the fact that the end of the shaft adjacent the operating mechanism travels in advance of the other end and it then becomes necessary to block the shaft in the slots by means of wooden stakes or wedges to prevent the shaft from being forced outwardly by the weight of the door and lading.

My invention overcomes this difficulty in a highly economical and practical manner by disposing the shaft actuating and locking means intermediate some of the doors, thereby greatly reducing the length of shaft subject to torsion, and further counteracting the bending tendency thereon by assuring supports for the shaft on both sides of the point of operation, and having the shaft support the load on both sides of the point of operation. As will be noted by reference to Figs. 1, 2 and 4, I omit one of the doors in the series of doors on each side of the car and substitute therefor the fixed floor section C, which extends from one cross beam to the other, and beneath this fixed floor section on the adjacent side of the car, the shaft 22 extends continuously, and is provided with shaft locking mechanism D, and shaft rotating means E.

The shaft locking mechanism D is disposed immediately adjacent one of the cross beams and includes a ratchet wheel 29 fixedly mounted on the shaft 22, said ratchet wheel having a hub 22$^a$, a creeper 30 being loosely mounted on the hub and restrained against turning movement by a bracket 31 which is mounted on the cross beam, movement of the creeper longitudinally of the shaft being limited by the securing pin 23$^a$ extending through the hub on the outer side of the creeper. Co-operating with the ratchet wheel 29 is a pawl 32 which is adapted to be locked in operative relation with the ratchet wheel 29 by means of a cam 33. The shaft actuating means E is mounted on the shaft an appreciable distance from the locking mechanism E and includes a ratchet wheel 34 having hubs 24$^a$ at each side thereof, said wheel being fixedly mounted on the shaft and having a series of teeth with which are adapted to co-operate two pawls 35 and 36 carried by an operating lever 37. Said lever 37 is oscillatably mounted on one hub of the ratchet wheel and maintained in position on said hub by the head of the rivet 35$^a$ on the outer side thereof, said rivet extending through the hub of the ratchet wheel and the shaft and provided at its lower end with a transversely extending socket 38 adapted to accommodate the end of a rod or bar to facilitate the operation. When both the locking and actuating mechanism are mounted on an overhanging end portion of a shaft, it is necessary to position these members very close to each other, for the purpose of bringing the point of operation as close as possible to the crossbeam, but with the double bearing for the shaft which the two adjacent cross beams provide I am enabled to place the actuating mechanism E at an appreciable distance from the locking mechanism D, afford accessibility to the parts, and provide for greater safety and convenience of operation. To compensate for the decrease in door dumping area brought about by the interposition of a fixed floor section C in the series of doors, I dispose the doors and operating mechanism parts in staggered relation so that the fixed floor section on one side of the center sill is disposed transversely opposite one of the doors in the series on the opposite side of the center sill, and in this manner the material which lodges on the fixed floor sections C is diverted in three different directions. The lines k—l and k—m indicate approximately and diagrammatically the outline of the portion of the load which would be left on each of the fixed floor sections, it being understood that the remaining pile slopes downwardly from the line k—l to the right and from the line k—m to the left and between the lines k—l and k—m downwardly to the center of the car.

My arrangement of doors and door operating mechanisms further permits standardization of parts and simplifies the operation of the same, as I dispense with all right and left castings and make the parts on one side of the center sill interchangeable with those on the opposite side so that as the operator faces the car, and operates the mechanism, the parts will be in the same relation to him on either side of the car. Heretofore it has been customary to dispose the door and operating mechanisms on the respective sides of the center sill, in transverse alinement so that if the operator manipulates the doors on one side of the car and the pawls and ratchets are then on his right hand, and then walks around the car to operate the transversely alined doors on the opposite side of the car, he will find the pawls and ratchets on his left hand thereby necessitating right and left hand operation, reducing his efficiency, and necessitating right and left parts, and different sets of patterns and dies, for the purpose of building the cars.

The importance of my improvement may be realized from an inspection of Fig. 2 wherein o—p indicates the transverse center of the car and it will be noted that both sides of the car are symmetrical about this line and the operating shafts and mechanism therefor are similarly disposed in relation to the center line o—p, and therefore right and lefts are dispensed with, and an operator will view the parts in the same relation and manipulate them in like manner for both sides of the car. With the arrangement shown, it will be evident that I have greatly reduced the dead weight of the car, reduced the number of moving parts and greatly enhanced the efficiency of opening or closing the doors, and also contributed to the safety and efficiceny of the operator.

While I have shown a preferred manner of carrying out my invention, the same is merely illustrative and I contemplate all changes and modifications that come within the scope of the claims appended hereto.

I claim:

1. In a dump car having a floor, the combination with floor doors disposed intermediate the end portions of the car, said doors opening outwardly to discharge lading towards the side of the car; a fixed floor section disposed intermediately of certain of said doors; a continuous door operating means adjacent the swinging edges of said doors; and means adjacent said operating means for actuating the same, said means being disposed in line with said fixed floor section.

2. In a dump car, the combination with the trucks near each end thereof; of a series of dumping doors disposed intermediately of said trucks, said doors opening outwardly to discharge lading towards the side of the car; a fixed floor section disposed intermediately of some of said doors; a continuous longitudinally extending door operating shaft adjacent the swinging ends of said doors and adapted to operate doors on either side of the fixed floor section; and shaft actuating means operable from said side of the car, and disposed beneath the aforesaid floor section.

3. In a dump car, the combination with a fixed floor section; of doors separated from each other longitudinally of the car by a fixed floor section; of a shaft extending continuously beneath the said fixed floor section and said doors and adapted to operate the doors on either side thereof in unison; and shaft actuating means intermediate the ends of said shaft disposed beneath the fixed floor.

4. In a dump car, the combination with a plurality of cross members spaced from each other longitudinally of the car; of a fixed floor extending therebetween; a door disposed adjacent each cross beam on either side of the fixed floor section; a continuous shaft carried by the respective cross beams, said shaft being extended beyond the cross beams and adapted to operate the doors adjacent thereto; and operating means disposed in line with said fixed floor section.

5. In a railway car the combination with a center sill; of a series of doors disposed on either side thereof; a fixed floor section disposed intermediate some of the doors in each series, said fixed floor section in each series being disposed in staggered relation with respect to that of the other series; door operating means for each series of doors; and means for actuating said operating means, said actuating means being disposed beneath the fixed floor section of each series.

6. In a dump car, the combination with the center sills, of a series of doors hinged thereto; of a rotatable and bodily movable shaft adjacent the free edge of the door, said shaft being adapted to operate the said series of doors in unison; and actuating means disposed intermediate some of the doors of the series for the purpose of imparting rotation and bodily movement to the said shaft, said actuating means being mounted on said shaft and movable therewith.

7. In a railway car, the combination with a center sill; of a series of floor doors disposed on either side thereof, each said series having a fixed floor section intermediate some of the doors, said floor section on one side of the center sill being transversely alined with a floor door of the series on the opposite sides of the center sill; an operating shaft for operating each said series of doors in unison; and shaft actuating means disposed beneath the fixed floor section.

8. In a dump car, the combination with a center sill; of a series of floor doors hinged to the center sill and opening outwardly toward the side of said car; of a shaft disposed adjacent the swinging edges of said doors and extending longitudinally of the car for operating said doors; shaft actuating means disposed intermediately the ends of said shaft, said actuating means being operable from the side of the car; and a fixed floor section interposed between said doors in line with said actuating means to afford an area protected from discharge from said doors while said actuating mechanism is being operated.

In witness that I claim the foregoing I have hereunto subscribed my name this 28th day of January, 1925.

ARGYLE CAMPBELL.